Patented Sept. 25, 1945

2,385,550

UNITED STATES PATENT OFFICE 2,385,550

PRODUCTION OF UNSATURATED NITRILES

Le Roy U. Spence, Elkins Park, Pa., assignor to Röhm & Haas Company, Philadelphia, Pa., a corporation of Delaware No Drawing. Application January 27, 1942, Serial No. 428,377

4 Claims. (Cl. 260—464)

This invention relates to the production of unsaturated aliphatic nitriles. It involves the formation of such unsaturated nitriles by the dehydrohalogenation of saturated, chlorinated or brominated nitriles, containing 3 to 8 carbon atoms in the molecule. Specifically, the invention is concerned with the process of liberating hydrogen chloride or hydrogen bromide from the molecules of the corresponding halogenated nitriles, under the influence of heat and catalysts, whereby unsaturated nitriles are produced.

An object of this invention is to facilitate the production of unsaturated nitriles by a process which assures high yields at lower cost and with less difficulty than by the methods known heretofore. Earlier methods involve at least one of two major difficulties, namely the use of high temperatures or the consumption of additional reagents. Both of these procedures are costly. Heretofore it has been customary to heat the halogenated nitriles together with inorganic bases or with amines which reacted with the liberated hydrogen halide whereby unsaturation of the nitrile resulted. The disadvantage of these prior processes is that reagents are continually being consumed, thus adding to the cost of operation.

This invention is particularly unique in that it involves a catalytic reaction which can be operated at lower temperatures without the necessity of employing materials which react and combine with the nitriles or with the decomposition products thereof. Furthermore, the yields of the desired products are high. Essentially, this invention consists of heating a halogenated nitrile in the presence of an amine hydrohalide which acts catalytically at temperatures of about 150° C. to about 250° C. The catalyst is preferably used as a molten salt in a still fitted with a fractionating column and condenser. While the temperature may be regulated over wide ranges by the ratio of nitrile and amine salt, it is desirable to maintain the temperature between 150-250° C. and the preferred range is 160-180° C. The chlorinated or brominated nitrile may be added gradually to the heated molten salt catalyst which is maintained at a temperature within the range aforesaid. The unsaturated nitrile, hydrogen halide, and any unchanged chlorinitrile or bromonitrile pass into the fractionating column, which returns the unchanged nitrile and allows the unsaturated nitrile and hydrogen halide to be removed from the top of the column. Alternatively, the fractionating column may be eliminated and the mixture of the unsaturated nitrile, hydrogen halide, and unchanged saturated nitrile may be washed with water or dilute alkali solution and the components separated. The recovered saturated nitrile may then be returned to the still for further reaction. The scope of this invention, however, is not limited to the above-described methods or apparatus.

In this process the amine hydrochloride and hydrobromide catalysts retain their activity for considerable lengths of time but, if contamination occurs, the catalyst may be reclaimed by treatment with alkalies followed by the distilling-off of the free amine and the subsequent conversion of the amine to the hydrohalide salt.

In general, the secondary and tertiary, aliphatic and cycloaliphatic amine hydrochlorides and hydrobromides are suitable catalysts, provided that these are stable at the temperature of the dehydrohalogenation reaction. Among the catalysts suitable for use in my process may be included the hydrochlorides and hydrobromides of cetyl dimethyl amine, lauryl dimethyl amine, di-2-ethyl hexyl amine, dimethylamine, lauryl methyl amine, dibutylamine, diamylamine, triamylamine, dicyclohexyl amine, benzyl dioctylamine.

The saturated halogenated nitriles which may be dehydrohalogenated to the corresponding unsaturated nitriles are those containing from 3 to 8 carbon atoms. Included in this group are $\alpha,\alpha,\beta$-trichloropropionitrile, $\alpha,\beta$-dichloropropionitrile, $\alpha$-chloroisobutyronitrile, $\alpha$-ethyl-$\alpha$-chloropropionitrile, $\alpha$-propyl-$\alpha$-chloropropionitrile, $\alpha,\alpha$-dichloropropionitrile, $\alpha$-bromoisobutyronitrile, $\alpha,\beta$-dibromopropionitrile, etc. The reaction, like catalytic reactions in general, is specific and is limited to compounds or certain definite configuration. For example, $\alpha$-chloropropionitrile cannot be satisfactorily dehydrohalogenated by this process, and it is only when the molecule contains additional alkyl or halogen groups that the dehydrohalogenation will take place. The compounds, which may be successfully dehydrohalogenated by this process, are identified by the general formula:

$$CH_2X \cdot CZY \cdot CN$$

where X is chlorine or bromine or hydrogen, Y is chlorine, bromine, hydrogen or an aliphatic group containing 1 to 5 carbon atoms, and Z is either chlorine or bromine and in which formula the total number of substituting groups, other than hydrogen, is at least two. By the dehydrohalogenation of compounds of this general formula there are obtained products which have a conjugated system, , and, as such, these compounds exhibit unusual characteristics, notably the tendency to polymerize.

Furthermore, these unsaturated nitriles may be converted to corresponding unsaturated amides, esters, and acids which are also valuable in the preparation of polymeric materials.

The following examples will serve to illustrate this invention.

Example 1

Twenty grams of cetyl dimethylamine hydrochloride was placed in a 250 cc. flask fitted with a thermometer and dropping funnel and attached to a fractionating column containing 20 inches of packing. A thermometer was located at the top of the fractionating column, a vertical reflux condenser was attached to a side arm at the top of the column, and a stopcock was provided for regulating the takeoff of the condensed liquid returned by the condenser, so that part of the liquid could be taken off and the rest returned as reflux to the column. The top of the reflux condenser was connected to a water scrubber which was used to collect HCl formed in the reaction.

The amine hydrochloride was heated to about 170° C. and $\alpha,\alpha,\beta$-trichloropropionitrile $$(CH_2ClCCl_2CN)$$

was gradually added to the flask, while the temperature was maintained at 165–170° C. The trichloropropionitrile used had a boiling point of 156–157°C. and $N_D^{20}$ 1.4677, and contained a small amount of $\alpha,\beta$-dichloropropionitrile as an impurity. After about 40 cc. of trichloropropionitrile was added to the flask, refluxing in the column began and the temperature at the top of the column increased to about 130° C. and considerable HCl evolved. The addition of the trichloropropionitrile was continued while the flask temperature was held at 165–170° C. The takeoff from the top of the column was so regulated as to keep the temperature at 130–135° C. After 192 g. (1.212 mols) of trichloropropionitrile had been added, the temperature in the flask was increased to about 185° C. and distillation was completed. The distillate weighed 142 g. and the yield of HCl, as determined by titration of the water scrubber, was 0.805 mol or 66% of theory.

The distillate was redistilled through a fractionating column in order to separate the various compounds present, and the following fractions were obtained:

| Fraction | B. P. | $N_D^{20}$ | Weight |
|---|---|---|---|
| | | | Grams |
| A | 85–130° | 1.4397 | 10 |
| B | 130–140° | 1.4834 | 63 |
| C | Residue | 1.4688 | 70.5 |
| | | | 143.5 |

Fraction A consisted chiefly of $\alpha$-chloroacrylonitrile (B. P. 88° C., $N_D^{20}$ 1.4294) produced presumably from $\alpha,\beta$-dichloropropionitrile originally present as an impurity. Fraction B consisted of $\alpha,\beta$-dichloroacrylonitrile (B. P. 131° C., $N_D^{20}$ 1.4846). Fraction C, the residue, was unchanged $\alpha,\alpha,\beta$-trichloropropionitrile. 43% of the original $\alpha,\alpha,\beta$-trichloropropionitrile was converted to dichloroacrylonitrile and the yield of the latter based on the amount of decomposed trichloropropionitrile was 69% of theory.

Example 2

One mol of $\alpha,\alpha,\beta$-trichloropropionitrile was refluxed in the absence of catalyst for a period of three hours. During this time there was no evidence of decomposition and at the end of the period the material distilled normally at its original boiling point.

Example 3

The process of Example 1 was repeated with 21 g. of di-2-ethyl hexylamine hydrochloride serving as catalyst. A total of 336 g. of $\alpha,\alpha,\beta$-trichloropropionitrile was heated in the presence of the catalyst, and 62% of this was converted to dichloroacrylonitrile. The final yield was 81% of theory, based on the amount of trichloropropionitrile which had been decomposed.

Example 4

When 319 g. of $\alpha,\alpha,\beta$-trichloropropionitrile was heated in the presence of 20 g. of lauryl dimethylamine hydrochloride as a catalyst, 62% of the former was decomposed and an 82.5% yield, calculated as above, of dichloroacrylonitrile was obtained.

Example 5

When 181 g. of $\alpha,\alpha,\beta$-trichloropropionitrile was heated in the presence of 35 g. of dimethylamine hydrochloride as a catalyst, 32% of the former was decomposed, and a 39% yield, calculated as above, of dichloroacrylonitrile was obtained.

Example 6

A series of consecutive "runs" was made by heating successive portions of $\alpha,\alpha,\beta$-trichloropropionitrile according to the method of Example 1. At the start, 24 g. of di-2-ethyl hexyl amine hydrochloride was introduced as catalyst. Each successive portion of trichloropropionitrile was added to the residue from the previous run. This residue served as a catalyst for the succeeding run. Following are the data of the results:

| Grams of $CH_2ClCCl_2CN$ | Hours of operation | Per cent conversion of $CH_2ClCCl_2CN$ | Per cent yield of $CHCl=CClCN$ |
|---|---|---|---|
| 298 | 2.0 | 45.7 | 76.5 |
| 235 | 2.0 | 55.6 | 89.2 |
| 285 | 2.0 | 52.8 | 90.1 |
| 206 | 1.7 | 61.2 | 87.2 |
| 370 | 2.5 | 48.0 | 88.5 |

The yield in the first run was low because of the trapping or retention of the trichloropropionitrile in the equipment. It will be noted that the catalyst remained active on continued use.

Example 7

One mol of $\alpha,\beta$-dichloropropionitrile ($N_D^{20}$ 1.4655) was heated in the presence of 20 g. of di-2-ethyl hexyl amine hydrochloride as catalyst according to the method of the previous examples. An 85% yield of $\alpha$-chloroacrylonitrile (B. P. 87–89° C., $N_D^{20}$ 1.4297) was obtained.

Example 8

A sample of $\alpha$-chloroisobutyronitrile (B. P. 118° C., $N_D^{20}$ 1.4051) was converted to methacrylonitrile (B. P. 92° C., $N_D^{20}$ 1.4002) by the method described above, by the use of di-2-ethylhexyl amine hydrochloride as a catalyst. The yield of methacrylonitrile, based on the amount of decomposed reactant, was 83%.

Example 9

One mol of $\alpha,\beta$-dibromopropionitrile was converted to $\alpha$-bromoacrylonitrile by the method described above by the use of di-2-ethyl-hexyl amine hydrobromide as a catalyst. The yield of α-bromoacrylonitrile, based on the amount of decomposed reactant, was over 70%.

I claim:

1. A process for the production of unsaturated nitriles which comprises heating at temperatures of about 150° C. to about 250° C., in the presence of a catalytic amount of an aliphatic amine hydrohalide, saturated, halogenated aliphatic nitriles from the group consisting of α-haloisobutyronitrile, α,β-dihaloisobutyronitrile, α,β-dihalopropionitrile, and α,α,β-trihaloproprionitrile.

2. The process of claim 1 in which the saturated, halogenated aliphatic nitrile is α,α,β-trichloroproprionitrile.

3. The process of claim 1 in which the saturated, halogenated aliphatic nitrile is α-chloroisobutyronitrile.

4. The process of claim 1 in which the saturated, halogenated aliphatic nitrile is α,β-dibromopropionitrile.

LE ROY U. SPENCE.